United States Patent
Phillips et al.

(10) Patent No.: US 6,400,965 B1
(45) Date of Patent: Jun. 4, 2002

(54) CELLULAR PHONE HANDSET SIM CARD READER AND METHOD FOR TESTING AND UPDATING A CELLULAR PHONE HANDSET MEMORY

(75) Inventors: John Charles Phillips, New Hill; James Calvin Peele, Raleigh, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/351,805

(22) Filed: Jul. 13, 1999

(51) Int. Cl.$^7$ ................................................ H04Q 7/20
(52) U.S. Cl. .................. 455/558; 379/357.01; 235/241
(58) Field of Search ................................ 455/556, 557, 455/558; 379/357.01, 357.05, 357.02; 235/492, 440, 441, 451, 375, 380

(56) References Cited

U.S. PATENT DOCUMENTS

| | | | | |
|---|---|---|---|---|
| 5,126,541 A | * | 6/1992 | Shinagawa | 235/438 |
| 5,206,495 A | * | 4/1993 | Kreft | 235/492 |
| 5,418,837 A | * | 5/1995 | Johansson et al. | 455/558 |
| 6,161,762 A | * | 12/2000 | Bashan et al. | 235/492 |

* cited by examiner

*Primary Examiner*—Dwayne Bost
*Assistant Examiner*—Lewis G. West
(74) *Attorney, Agent, or Firm*—Goats & Bennett, PLLC (57) ABSTRACT

An improved SIM card reader with at least one reader data contact that is connected, typically through a control unit, to a memory, through which reader data contact predetermined software update data may be transmitted for storage in the memory of a mobile telecommunication device. The SIM card reader may be integral to the mobile communication device. In a preferred embodiment, the SIM card reader receives an improved SIM card having a card data contact that cooperatively engages with the reader data contact to electrically couple the reader data contact and the card data contact, thereby to provide a data path through which software update data may be transmitted for storage in the memory of a mobile telecommunication device. The at least one reader data contact may be used to "flash" the memory of a mobile telecommunication device with software updates, for instance. Additional reader data contacts may be implemented for testing functions, such as, for instance, Received Signal Strength Indication (RSSI), transmission power confirmation, VCO Frequency confirmation, and power level.

29 Claims, 8 Drawing Sheets

CELLULAR PHONE HANDSET SIM CARD READER AND METHOD FOR TESTING AND UPDATING A CELLULAR PHONE HANDSET MEMORY

BACKGROUND OF THE INVENTION

1. Field of the Invention

The present invention relates generally to updating a memory of a cellular telephone handset with modified software and, more particularly, to using a SIM card and reader to "flash" the memory of the cellular telephone handset with a software update.

2. Description of the Related Art

Figure 1:
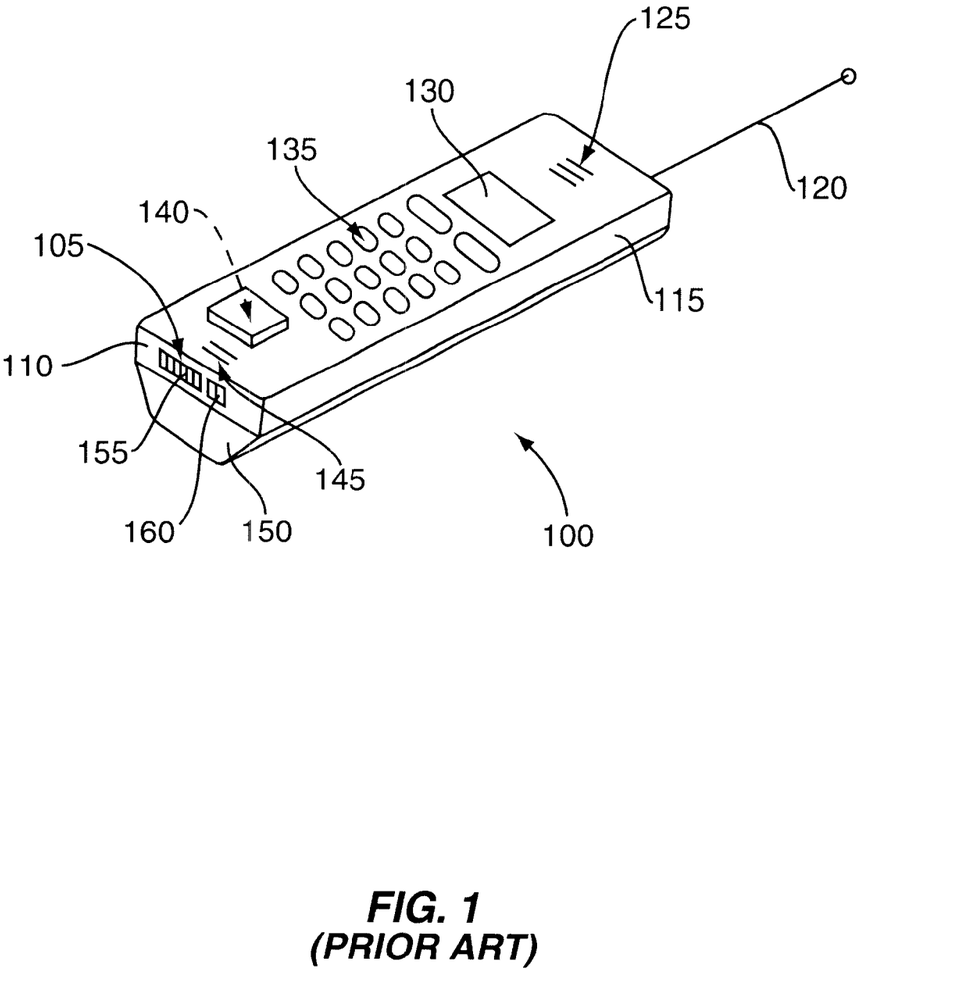
FIG. 1 is a side and top perspective view of a typical mobile communication device in accordance with the related art.
Figure 2:
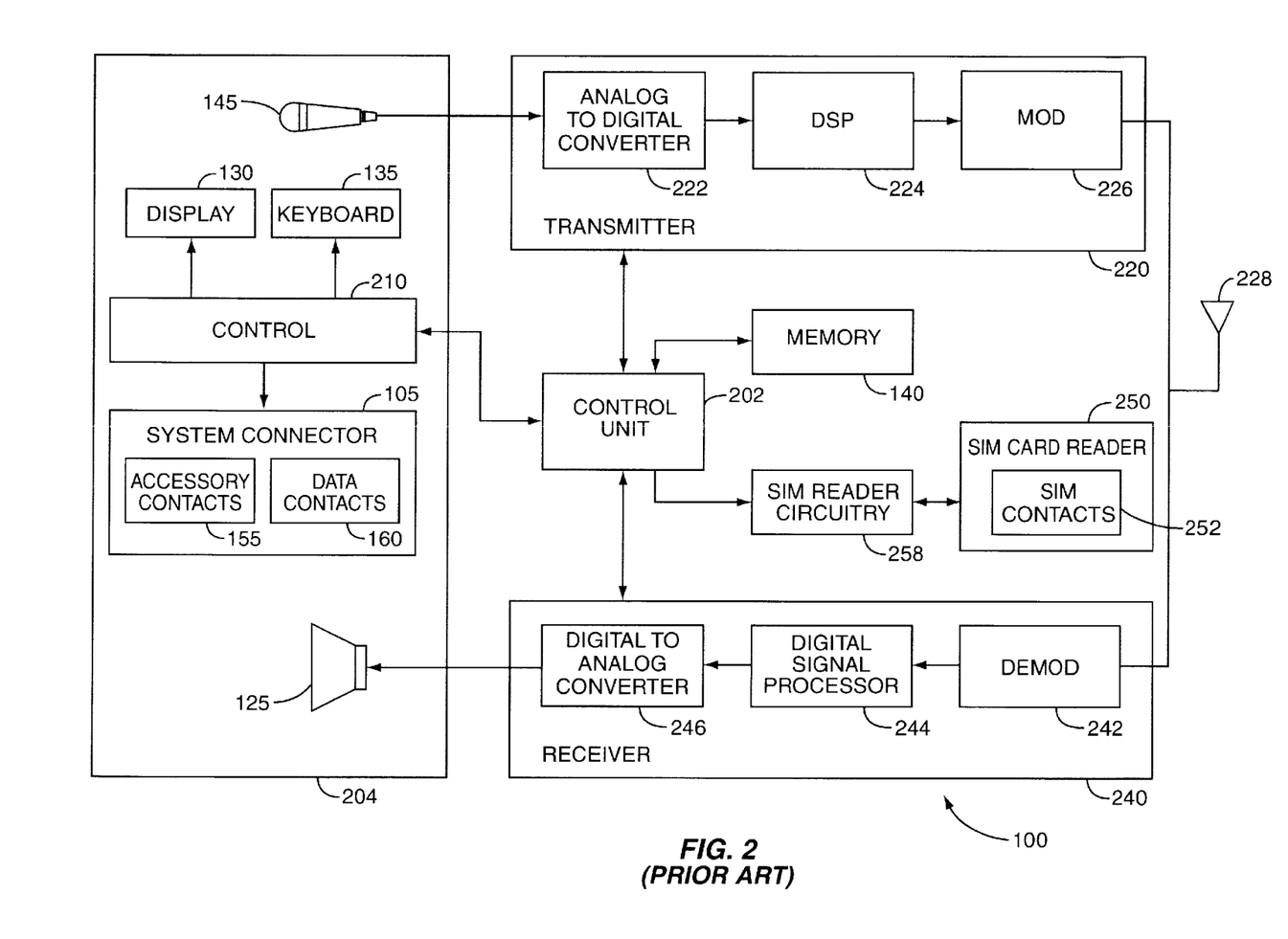
FIG. 2 is a functional block diagram of a typical mobile communication device in accordance with the related art.

In the related art shown in FIGS. 1 and 2, a typical mobile telecommunication device 100 such as a cellular telephone handset, for instance, has a multi-pin connector called a "system connector" 105 typically positioned on a bottom end 110 of a housing 115 of the mobile telecommunication device 100, an antenna 120, a speaker 125, a display 130, a keypad 135, a memory 140 located internal to the housing 115, a microphone 145, and a battery 150. In accordance with the related art, a block diagram in FIG. 2 shows that the mobile communication device 100 typically includes a control unit or logic unit 202, an operator interface 204, a transmitter 220, a receiver 240, a SIM card reader 250, and the memory 140. The mobile communication device 100 shown in FIGS. 1 and 2 is a fully functional radio transceiver capable of transmitting and receiving digital signals. Those skilled in the art will recognize, however, that the mobile communication device 100 may be implemented with an analog transceiver.

Referring to FIG. 2, the operator interface 204 typically includes the system connector 105, the speaker 125, the display 130, the keypad 135, the microphone 145, and a control unit 210. The display 130 allows the operator to see dialed digits and call status information. The keypad 135 allows the operator to dial numbers, enter commands, and select options. The control unit 210 interfaces the system connector 105, the display 130 and the keypad 135 with the control unit 202. The microphone 145 receives audio signals from the user and converts the audio signals to analog signals. The speaker 125 converts analog signals from the receiver 240 to audio signals that can be heard by the user.

The analog signals from the microphone 145 are applied to the transmitter 220. The transmitter 220 includes an analog-to-digital converter 222, a digital signal processor 224, and a modulator 226. The analog to digital converter 222 changes the analog signals from the microphone 145 into a digital signal. The digital signal is passed to the digital signal processor 224. The digital signal processor 224 compresses the digital signal and inserts error detection, error correction and signaling information. The compressed and encoded signal from the digital signal processor 224 is passed to the modulator 226. The modulator 226 converts the signal to a form that is suitable for transmission through an antenna 228 on a RF carrier.

The receiver 240 includes a demodulator 242, a digital signal processor 244, and a digital to analog converter 246. Signals received through the antenna 228 are passed to the demodulator 242, which extracts the transmitted bit sequence from the received signal. The demodulator 242 passes the demodulated signal to the digital signal processor 244 which decodes the signal, corrects channel-induced distortion, and performs error detection and correction. As is known in the art, the digital signal processor 244 also separates control and signaling data from speech data. The control and signaling data is passed to the control unit 202. Speech data is processed by a speech decoder and passed to the digital-to-analog converter 246. The digital-to-analog converter 246 converts the speech data into an analog signal which is applied to the speaker 145 to generate audible signals which can be heard by the user.

The control unit 202, such as a programmed microprocessor, functions to coordinate the operation of the transmitter 220 and the receiver 240. The memory 140 stores the program instructions and data needed by the control unit 202 to control the communications terminal 100. The functions performed by the control unit 202 include power control, channel selection, timing, as well as a host of other functions. The control unit 202 inserts signaling messages into the transmitted signals and extracts signaling messages from the received signals. The control unit 202 responds to any base station commands contained in the signaling messages, and implements those commands. When the user enters commands via the keypad 135, the commands are transferred to the control unit 202 for action.

As is known in the art, the memory 140 stores software program instructions and data needed by the control unit 202 to control the mobile telecommunication device 100. Typically, the system connector 105 provides a plurality of connection terminals 155 (see FIG. 1) for use as electronic connection to various end-user accessories (not shown), such as, for instance, a battery charger and a portable hands-free device, etc. In some instances, the system connector 105 provides one or more additional connection terminals 160 that may be used by factory or repair shop personnel to "flash" the memory 140 (shown in phantom in FIG. 1) of the mobile telecommunication device 100 with a software update of stored software program instructions and data by transmitting therethrough data signals representing the software update, wherein such transmitted data signals are electronically stored in the memory 140.

Figure 3:
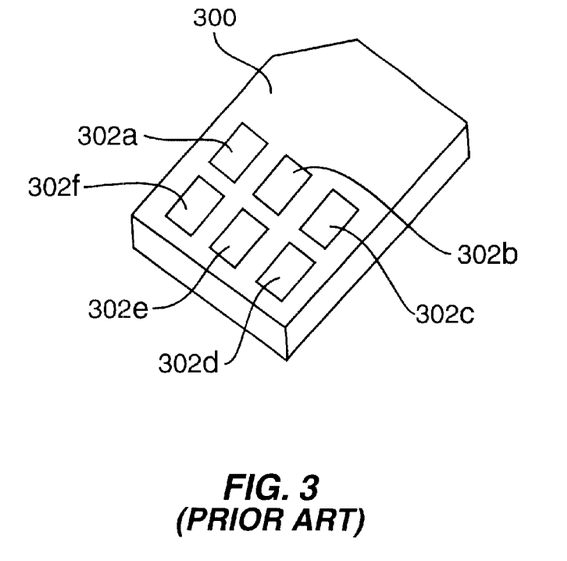
FIG. 3 is a side and top perspective view of a typical SIM card in accordance with the related art.
Figure 4:
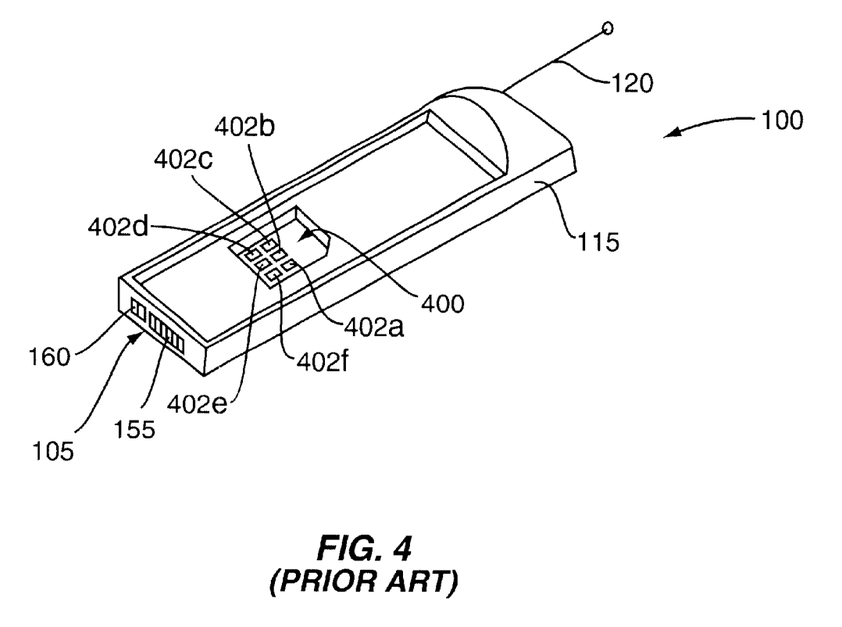
FIG. 4 is a side and bottom perspective view of a typical mobile communication device, showing an integral SIM reader with SIM that may receive the SIM card of FIG. 3, in accordance with the related art.

Moreover, as is known in the art, various mobile telecommunication devices 100, particularly those operating on the Groupe Special Mobile (also known as GSM or Global System for Mobile Communications) standard digital cellular phone service, incorporate the use of a Subscriber Identity Module (SIM) card reader 250 with standard SIM reader contacts 252, which reader 250 typically receives a SIM card 300 with corresponding standard SIM card contacts (see FIG. 3). FIG. 3 shows the SIM card 300 typically having six SIM card data contacts 302a, 302b, 302c, 302d, 302e, 302f, although it will be recognized that any number of SIM card data contacts would fall within the scope of the invention. The SIM card reader 250 may be integral to the mobile telecommunication device 100, typically accessible beneath the battery 150 (see FIG. 4). FIG. 4 shows a SIM card reader 400 having reader contacts 402a, 402b, 402c, 402d, 402e, 402f that correspond respectively to the SIM card data contacts 302a, 302b, 302c, 302d, 302e, 302f. The SIM card reader 250 may be connected to SIM card reader circuitry 258, which may be connected to the control unit 202. The SIM card 300 typically contains known subscriber-related information that facilitates a telephone call from any valid mobile communication device 100, because the subscriber-related information is used to complete the call rather than specific internal physical identifiers (such as an internal serial number) that may be associated with the mobile telecommunication device 100. The SIM card 300 may be installed or inserted into the SIM card reader 400 of the mobile telecommunication device 100, thereby to link that mobile telecommunication device 100 to the subscriber-related information stored on the SIM card 300.

As the size of mobile telecommunication devices 100 decreases, the reduction of the size of various components within the mobile telecommunication device 100 becomes valuable and desirable in order to decrease the size of the mobile telecommunication device 100. As is known in the art, one of the largest components in the mobile telecommunication device 100 is the system connector 105. Consequently, a need exists for reducing the size of the system connector 105 while retaining the functional ease of flashing the memory 140 of the mobile telecommunication device 100, particularly by factory or repair shop personnel.

BRIEF SUMMARY OF THE INVENTION

It is therefore an object of the present invention to reduce the size of the system connector of a mobile telecommunication device by transmitting software update data through a SIM card reader instead of through the system connector.

It is another object of the present invention to provide a method of using a SIM card reader to flash memory of a mobile telecommunication device with software updates.

It is a feature of the present invention to provide an improved SIM card reader through which memory of a mobile communication device may be flashed with software updates.

It is another feature of the present invention to provide at least one data path contact in a SIM card reader, through which software update data may be transmitted for storage in the memory of a mobile telecommunication device.

It is another feature of the present invention to provide at least one test contact that is connected to selected test points in the mobile telecommunication device, for use in testing such test points.

Briefly described according to one embodiment of the present invention, an improved SIM card reader is provided with at least one reader data contact that is connected, typically through a control unit, to a memory, through which contact predetermined software update data may be transmitted for storage in the memory of a mobile telecommunication device. The SIM card reader may be integral to the mobile communication device. In a preferred embodiment, the SIM card reader receives an improved SIM card having a card data contact that cooperatively engages with the reader data contact to electrically couple the reader data contact and the card data contact, thereby to provide a data path through which software update data may be transmitted for storage in the memory of a mobile telecommunication device. The at least one reader data contact may be used to "flash" the memory of a mobile telecommunication device with software updates, for instance. Additional reader data contacts may be implemented for testing functions, such as, for instance, Received Signal Strength Indication (RSSI), transmission power confirmation, VCO Frequency confirmation, and power level.

In accordance with a preferred embodiment, a SIM card reader device through which an electronic component of a mobile communication device may be tested is provided, wherein the SIM card reader device has SIM reader normal mode contacts that electronically couple with normal mode contacts of the SIM card when the SIM card is received by the SIM card reader device, comprising: at least one SIM reader test mode contact in the SIM card reader device that is separate from the SIM reader normal mode contacts of the SIM card reader; at least one SIM card test mode contact in the SIM card that is separate from the SIM card normal mode contacts of the SIM card, the at least one SIM card test mode contact being electronically coupled with the at least one SIM reader test mode contact when the SIM card is received by the SIM card reader device; and whereby the electronic component of the mobile communication device may be tested by transmitting data through the at least one SIM card test mode contact to the electronic component when the SIM card is received by the SIM card reader device.

An advantage of the present invention is that data contacts may be removed from the system connector, thereby reducing the size of the system connector, particularly in mobile communication devices that require the use of a SIM reader.

Another advantage of the present invention is improved protection against electrostatic discharge (ESD) with data contacts that are not accessible outside the phone.

Another advantage of the present invention is increased security against counterfeiting with data contacts that are not accessible outside the phone.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

1. Detailed Description of the Figures

Figure 5:
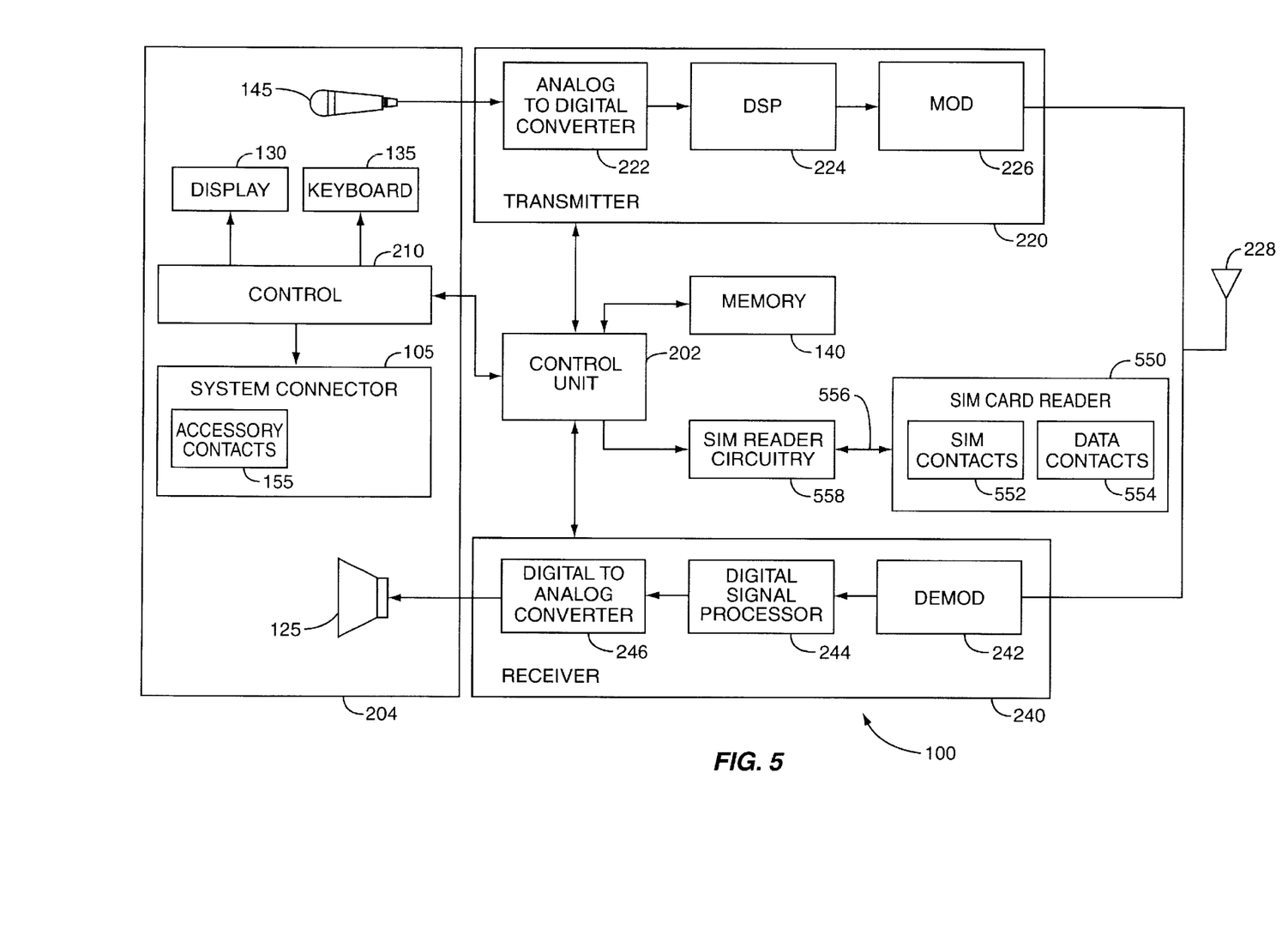
FIG. 5 is a functional block diagram of a mobile communication device that implements a SIM card reader with data contacts in accordance with a preferred embodiment of the present invention.

Referring now to FIG. 5, a block diagram shows the mobile telecommunication device 100 having a SIM reader 550 with standard SIM reader contacts 552 and additional SIM reader data contacts 554 in accordance with a preferred embodiment of the present invention. The standard SIM reader contacts 552 may be used to provide similar Subscriber Identification information that is provided by the standard SIM reader contacts 252. In accordance with the present invention, the SIM reader data contacts 554 may couple with a corresponding data contact, such as a data contact 610 provided in a modified SIM card 600 shown in FIG. 6, modified from that shown in FIG. 3, for instance. The standard SIM reader data contacts 554 are connected to the control unit 202 to provide electrical coupling to a bidirectional data path 556 between the SIM reader data contacts 554 and SIM reader circuitry 558 connected to the control unit 202, thereby to enable a user (not shown) to "flash" the memory 140 with software update data through the SIM reader data contacts 554. In a preferred embodiment, the bi-directional data path 556 may bypass the control unit and provide direct connection between the SIM reader data contacts 554 and the memory 140.

Figure 7:
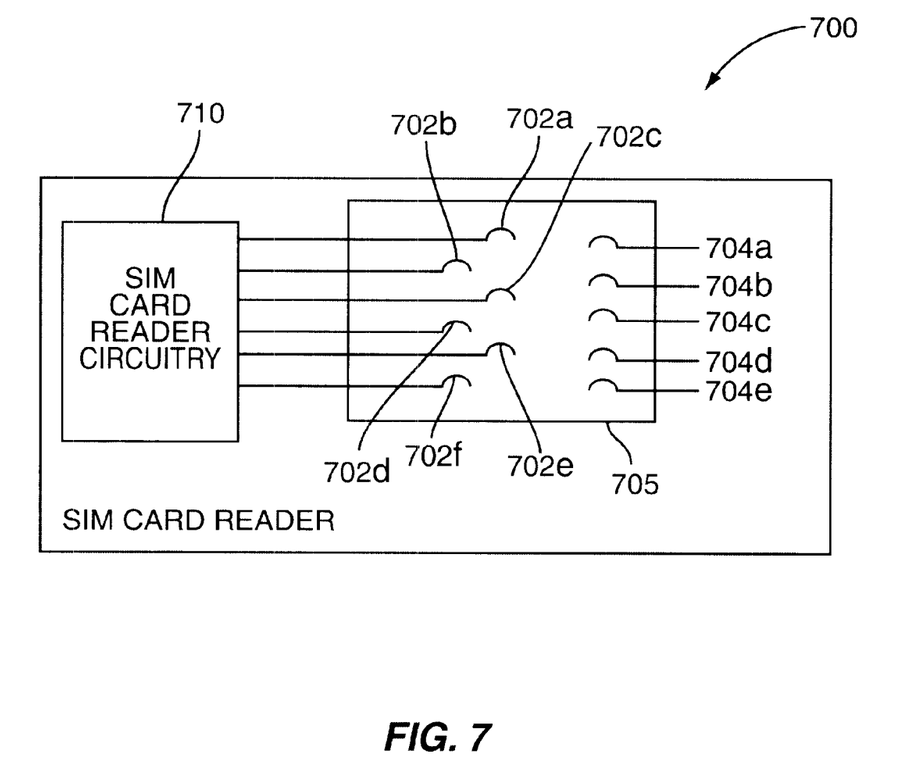
FIG. 7 is a block diagram of a SIM card reader having additional spring data contacts in accordance with a preferred embodiment of the present invention.

FIG. 7 shows a preferred embodiment of a SIM card reader 700 in accordance with the present invention, having standard SIM reader spring contacts 702a, 702b, 702c, 702d, 702e, and 702f, as well as additional spring contacts 704a, 704b, 704c, 704d and 704e on a SIM connector socket 705. The standard SIM reader spring contacts 702a, 702b, 702c, 702d, 702e, and 702f may be connected to SIM reader circuitry 710 of the mobile telecommunication device 100, and may be used to provide similar Subscriber Identification information that is provided by the standard SIM reader contacts 252. The additional spring contacts 704a, 704b, 704c, 704d and 704e may be connected to SIM reader circuitry 710 of the mobile telecommunication device 100, and may be used for various flash and test functions in accordance with the present invention. For instance, the additional spring contact 704a may be used to flash the memory 140 of the mobile telecommunication device 100 with software updates. The additional spring contact 704b may be used as a Received Signal Strength Indication (RSSI), for instance. The additional spring contact 704c may be used to verify transmission power, for instance. The additional spring contact 704d may be used to test VCO Frequency, for instance. The additional spring contact 704e may be used to test power level, for instance.

Figure 8:
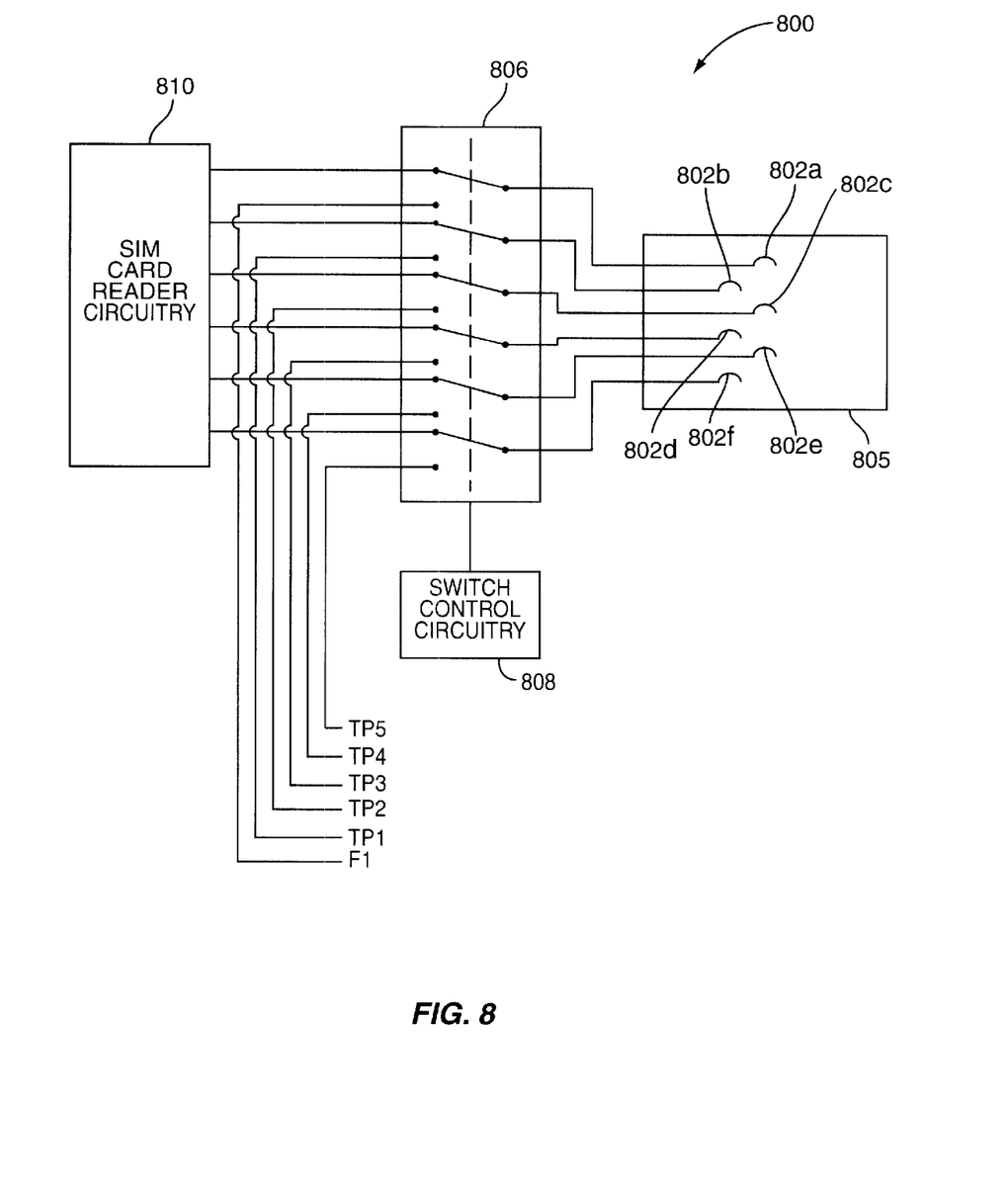
FIG. 8 is a block diagram of a SIM card reader that implements a multiplexer in accordance with a preferred embodiment of the present invention.

FIG. 8 shows a preferred embodiment of a SIM card reader 800 in accordance with the present invention, having standard SIM reader spring contacts 802a, 802b, 802c, 802d, 802e, and 802f on a SIM connector socket 805 with a multiplexer 806 controlled by switch control circuitry 808 to switch the SIM card reader 800 from a normal operating mode to a flash/test mode. Use of the multiplexer 806 controlled by switch control circuitry 808 to switch the SIM card reader 800 from a normal operating mode to a flash/test mode eliminates the cost of the additional spring contacts shown in FIG. 7. In the normal operating mode, the SIM reader spring contacts 802a, 802b, 802c, 802d, 802e, and 802f are connected to SIM card reader circuitry 810. In the flash/test operating mode, the SIM reader spring contacts 802a, 802b, 802c, 802d, 802e, and 802f are disconnected from the SIM card reader circuitry 810 and connected to a flash terminal F1 and various test points TP1, TP2, TP3, TP4, and TP5 within the mobile telecommunication device 100.

For instance, the SIM reader spring contact 802a may be connected to the flash terminal F1 to flash the memory 140 of the mobile telecommunication device. Similarly, the SIM reader spring contact 802b may be connected to the test point TP1 to be used as a Received Signal Strength Indication (RSSI), for instance. The SIM reader spring contact 802c may be connected to the test point TP2 to be used to test transmission power, for instance. The SIM reader spring contact 802d may be connected to the test point TP3 to be used to test VCO Frequency, for instance. The SIM reader spring contact 802e may be connected to the test point TP4 to be used to test power level, for instance. The SIM reader spring contact 802f may be connected to the test point TP5 to be used to test audio deviation, for instance.

Figure 9:
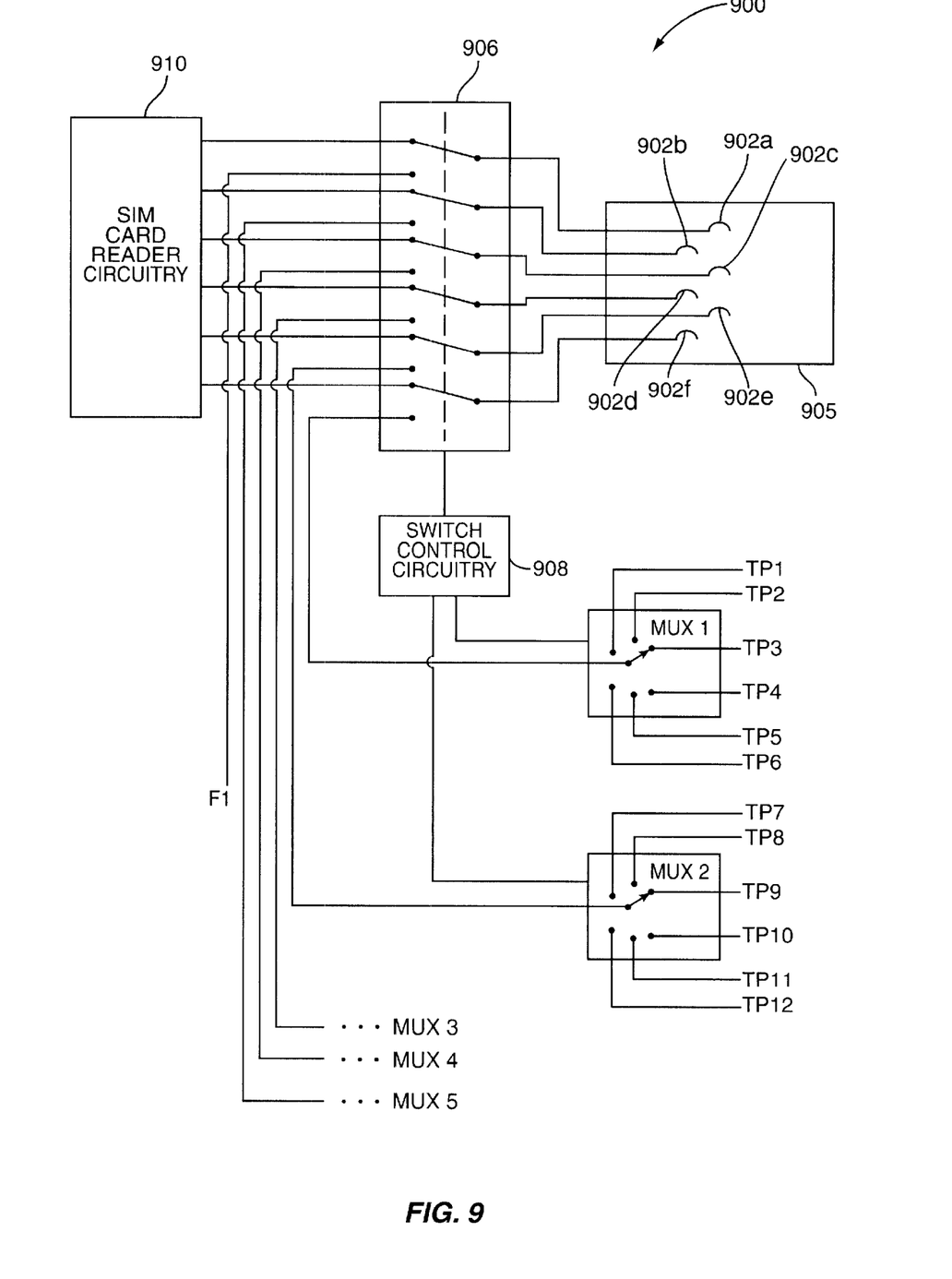
FIG. 9 is a block diagram of a SIM card reader that implements a plurality of multiplexers in accordance with a preferred embodiment of the present invention.

FIG. 9 shows a preferred embodiment of a SIM card reader 900 that implements a plurality of additional multiplexers in accordance with the present invention. The SIM card reader 900 has standard SIM reader spring contacts 902a, 902b, 902c, 902d, 902e, and 902f on a SIM connector socket 905 with a multiplexer 906 controlled by switch control circuitry 908, thereby to switch the SIM card reader 900 from a normal operating mode to a flash/test mode. Use of the multiplexer 906 controlled by switch control circuitry 908 to switch the SIM card reader 900 from a normal operating mode to a flash/test mode eliminates the cost of the additional spring contacts shown in FIG. 7. In the normal operating mode, the SIM reader spring contacts 902a, 902b, 902c, 902d, 902e, and 902f are connected to SIM card reader circuitry 910. In the flash/test operating mode, the SIM reader spring contacts 902a, 902b, 902c, 902d, 902e, and 902f are disconnected from the SIM card reader circuitry 910 and respectively connected to a flash terminal F1 and a plurality of multiplexers MUX1, MUX2, MUX3, MUX4, and MUX5, all part of the SIM card reader 900 within the mobile telecommunication device 100. The plurality of multiplexers MUX1, MUX2, MUX3, MUX4, and MUX5 may provide access to a plurality of test points within the mobile telecommunication device 100.

For instance, the SIM reader spring contact 902a may be connected to the flash terminal F1 to flash the memory 140 of the mobile telecommunication device. Similarly, the SIM reader spring contact 902b may be connected to the multiplexer MUX1, thereby to provide accessible connection to any one of the test points TP1, TP2, TP3, TP4, TP5 and TP6, for instance. Likewise, the SIM reader spring contact 902c may be connected to the multiplexer MUX2, thereby to provide accessible connection to any one of the test points TP7, TP8, TP9, TP10, TP11 and TP12, for instance. Similar connections between 902d, 902e, 902f and MUX3, MUX4, MUX5, respectively, may be understood by those skilled in the art.

2. Operation of the Preferred Embodiment

Figure 6:
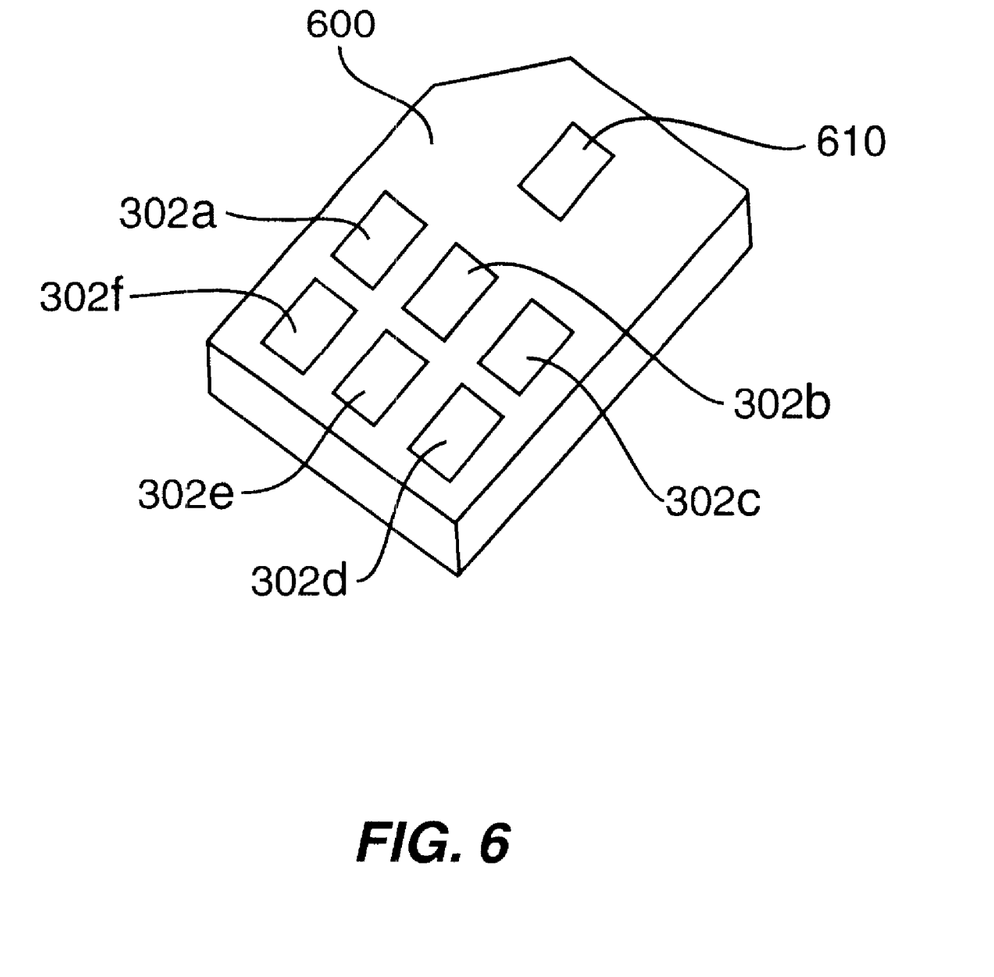
FIG. 6 is a side and top perspective view of a SIM card that may be received by the SIM reader of the present invention.

In operation, the SIM card reader 550 having standard SIM contacts 552 and additional SIM reader data contacts 554 may receive the modified SIM card 600 having the standard SIM contacts 302a, 302b, 302c, 302d, 302e, 302f and the data contact 610 that corresponds to the data contact 554. The modified SIM card 600 may be attached to a data cable (not shown) as is known in the art. Alternatively, the modified SIM card 600 may receive transmitted signals in remote manner as is known in the art. In accordance with a preferred embodiment of the present invention, the memory 140 may be flashed with software update data through the SIM reader data contacts 554. Alternately, in accordance with another preferred embodiment of the present invention, various test points of the mobile telecommunication device 100 may be accessed for testing through standard SIM contacts 302a, 302b, 302c, 302d, 302e, and 302f.

The foregoing description of the preferred embodiment of the present invention has been presented for purposes of illustration and description. It is not intended to be exhaustive or to limit the present invention to the precise form disclosed, and obviously many modifications and variations are possible in light of the above teachings.

The preferred embodiment was chosen and described in order to best explain the principles of the present invention and its practical application to those persons skilled in the art, and thereby to enable those persons skilled in the art to best utilize the present invention in various embodiments and with various modifications as are suited to the particular use contemplated. It is intended that the scope of the present invention be broadly defined by the claims which follow.

What is claimed is:

1. A SIM card reader device through which an electronic component of a mobile communication device may be tested, wherein the SIM card reader device has SIM reader normal mode contacts that electronically couple with SIM card normal mode contacts of the SIM card when the SIM card is received by the SIM card reader device, comprising:

at least one SIM reader test mode contact in the SIM card reader device that is separate from the SIM reader normal mode contacts of the SIM card reader;

at least one SIM card test mode contact in the SIM card that is separate from the SIM card normal mode contacts of the SIM card, said at least one SIM card test mode contact being electronically coupled with said at least one SIM reader test mode contact when the SIM card is received by the SIM card reader device; and whereby the electronic component of the mobile communication device may be tested by transmitting data through said at least one SIM card test mode contact to the electronic component when the SIM card is received by the SIM card reader device.

2. The SIM card reader device of claim 1, wherein the electronic component is an electronic memory and said at least one SIM reader test mode contact is electronically coupled with said electronic memory of the mobile communication device.

3. The SIM card reader device of claim 2, whereby the electronic memory may be re-flashed by transmitting update data through said at least one SIM card test mode contact to the memory when the SIM card is received by the SIM card reader device.

4. The SIM card reader device of claim 1, further comprising:

switching means coupling said at least one SIM reader test mode contact in the SIM card reader device to said at least one SIM card test contact in the SIM card, for switching the SIM card reader device from a normal operating mode to a test mode, and from said test mode to said normal operating mode.

5. The SIM card reader device of claim 4, wherein said switching means comprises at least one multiplexer.

6. The SIM card reader device of claim 2, further comprising:

switching means coupling said at least one SIM reader test mode contact in the SIM card reader device to said at least one SIM card test contact in the SIM card, for switching the SIM card reader device from a normal operating mode to a test mode, and from said test mode to said normal operating mode.

7. The SIM card reader device of claim 6, wherein said switching means comprises at least one multiplexer.

8. The SIM card reader device of claim 3, further comprising:

switching means coupling said at least one SIM reader test mode contact in the SIM card reader device to said at least one SIM card test contact in the SIM card, for switching the SIM card reader device from a normal operating mode to a test mode, and from said test mode to said normal operating mode.

9. The SIM card reader device of claim 8, wherein said switching means comprises at least one multiplexer.

10. A mobile communication device having a memory that is capable of being re-flashed through a SIM card reader of the mobile communication device, wherein the SIM card reader has SIM reader normal mode contacts that electronically couple with SIM card normal mode contacts of the SIM card when the SIM card is received by the SIM card reader, the mobile communication device comprising:

at least one SIM reader test mode contact in the SIM card reader that is separate from the SIM reader normal mode contacts of the SIM card reader, said at least one SIM reader test mode contact being electronically coupled with the memory;

at least one SIM card test mode contact in the SIM card that is separate from the SIM card normal mode contacts of the SIM card, said at least one SIM card test mode contact being electronically coupled with said at least one SIM reader test mode contact when the SIM card is received by the SIM card reader; and whereby the memory may be re-flashed by transmitting update data through said at least one SIM card test mode contact to the memory when the SIM card is received by the SIM card reader.

11. The mobile communication device of claim 10, further comprising:

switching means coupling said at least one SIM reader test mode contact in the SIM card reader to said at least one SIM card test contact in the SIM card, for switching the SIM card reader from a normal operating mode to a test mode, and from said test mode to said normal operating mode.

12. The SIM card reader device of claim 11, wherein said switching means comprises at least one multiplexer.

13. A mobile communication device having an electronic component that is capable of being tested through a SIM card reader of the mobile communication device, wherein the SIM card reader has SIM reader normal mode contacts that electronically couple with SIM card normal mode contacts of the SIM card when the SIM card is received by the SIM card reader, the mobile communication device comprising:

at least one SIM reader test mode contact in the SIM card reader that is separate from the SIM reader normal mode contacts of the SIM card reader;

at least one SIM card test mode contact in the SIM card that is separate from the SIM card normal mode contacts of the SIM card, said at least one SIM card test mode contact being electronically coupled with said at least one SIM reader test mode contact when the SIM card is received by the SIM card reader; and whereby the electronic component of the mobile communication device may be tested by transmitting data through said at least one SIM card test mode contact to the electronic component when the SIM card is received by the SIM card reader.

14. The mobile communication device of claim 13, wherein the electronic component is an electronic memory and said at least one SIM reader test mode contact is electronically coupled with said electronic memory of the mobile communication device.

15. The mobile communication device of claim 14, whereby the electronic memory may be re-flashed by transmitting update data through said at least one SIM card test mode contact to the memory when the SIM card is received by the SIM card reader.

16. The mobile communication device of claim 13, further comprising:

switching means coupling said at least one SIM reader test mode contact in the SIM card reader to said at least one SIM card test contact in the SIM card, for switching the SIM card reader from a normal operating mode to a test mode, and from said test mode to said normal operating mode.

17. The SIM card reader device of claim 16, wherein said switching means comprises at least one multiplexer.

18. The mobile communication device of claim 14, further comprising:
switching means coupling said at least one SIM reader test mode contact in the SIM card reader to said at least one SIM card test contact in the SIM card, for switching the SIM card reader from a normal operating mode to a test mode, and from said test mode to said normal operating mode.

19. The SIM card reader device of claim 18, wherein said switching means comprises at least one multiplexer.

20. The mobile communication device of claim 15, further comprising:
switching means coupling said at least one SIM reader test mode contact in the SIM card reader to said at least one SIM card test contact in the SIM card, for switching the SIM card reader from a normal operating mode to a test mode, and from said test mode to said normal operating mode.

21. The mobile communication device of claim 20, wherein said switching means comprises at least one multiplexer.

22. A SIM card reader device and SIM card combination, comprising:
at least one normal mode reader contact in each of the SIM card reader device and the SIM card, through which operational data may be transmitted during a normal mode when the SIM card is received by the SIM card reader device; and
at least one test mode reader contact in each of the SIM card reader device and the SIM card, through which update data may be transmitted during a test mode when the SIM card is received by the SIM card reader.

23. The SIM card reader device and SIM card combination of claim 22, wherein said at least one test mode reader contact in the SIM card reader device is electrically coupled to an electronic component of a mobile communication device.

24. The SIM card reader device and SIM card combination of claim 23, wherein said electronic component is an electronic memory.

25. The SIM card reader device and SIM card combination of claim 24, wherein said electronic memory may be re-flashed by transmitting update data through said at least one test mode reader contact in the SIM card reader device.

26. The SIM card reader device and SIM card combination of claim 23, further comprising:
switching means coupling said at least one test mode reader contact in each of the SIM card reader device and the SIM card, for switching the SIM card reader device from a normal operating mode to a test mode, and from said test mode to said normal operating mode.

27. The SIM card reader device and SIM card combination of claim 26, wherein said switching means comprises at least one multiplexer.

28. A method of re-flashing a memory of a mobile communication device through a SIM card reader that receives a SIM card having SIM card contacts, wherein the SIM card reader has SIM reader contacts that electronically couple with the SIM card contacts when the SIM card is received by the SIM card reader, comprising the steps of:
(a) providing at least one SIM reader data contact in the SIM card reader that is separate from the SIM reader contacts of the SIM card reader, said at least one SIM reader data contact being electronically coupled with the memory;
(b) providing at least one SIM card data contact in the SIM card that is separate from the SIM card contacts of the SIM card, said at least one SIM card data contact being electronically coupled with said at least one SIM reader data contact when the SIM card is received by the SIM card reader; and
(c) transmitting memory update data through said at least one SIM card data contact to the memory when the SIM card is received by the SIM card reader.

29. A method of testing an electronic component of a mobile communication device through a SIM card reader of the mobile communication device, wherein the SIM card reader has SIM reader normal mode contacts that electronically couple with SIM card normal mode contacts of the SIM card when the SIM card is received by the SIM card reader, comprising the steps of:
(a) providing at least one SIM reader test mode contact in the SIM card reader that is separate from the SIM reader normal mode contacts of the SIM card reader;
(b) providing at least one SIM card test mode contact in the SIM card that is separate from the SIM card normal mode contacts of the SIM card, said at least one SIM card test mode contact being electronically coupled with said at least one SIM reader test mode contact when the SIM card is received by the SIM card reader; and
(c) transmitting data through said at least one SIM card test mode contact to the electronic component when the SIM card is received by the SIM card reader.

* * * * *